United States Patent [19]
Tosaka et al.

[11] 4,316,662
[45] Feb. 23, 1982

[54] BRAKE DEVICE FOR SHUTTER

[75] Inventors: Yoichi Tosaka, Tokyo; Teiji Hashimoto, Kawasaki; Nobuo Tezuka, Tokyo, all of Japan

[73] Assignee: Canon Kabushiki Kaisha, Tokyo, Japan

[21] Appl. No.: 112,699

[22] Filed: Jan. 16, 1980

[30] Foreign Application Priority Data

Jan. 31, 1979 [JP] Japan .................. 54-10920[U]

[51] Int. Cl.³ .............................................. G03B 9/28
[52] U.S. Cl. .................................. 354/241; 354/252
[58] Field of Search .............. 354/241, 242, 243, 244, 354/252

[56] References Cited

U.S. PATENT DOCUMENTS 2,039,517  5/1936  Black ................................. 354/241
2,256,226  9/1941  Wagner et al. ..................... 354/242
4,109,266  8/1978  Inove ................................. 354/252

FOREIGN PATENT DOCUMENTS 54-2119  1/1979  Japan ................................. 354/242
54-2120  1/1979  Japan ................................. 354/242

Primary Examiner—Russell E. Adams
Attorney, Agent, or Firm—Toren, McGeady & Stanger

[57] ABSTRACT

A brake device for use with a shutter having a driving member which runs down when the shutter is opened or closed, includes a brake member pivotally rotatable about a stationary shaft and arranged upon engagement with the shutter driving member to slow it down and bring it to rest. An elastic material is employed in forming at least one of the above-described brake member and stationary shaft to effect a frictional engagement therebetween which contributes to the braking of the shutter driving member.

9 Claims, 5 Drawing Figures

BRAKE DEVICE FOR SHUTTER

BACKGROUND OF THE INVENTION

1. Field of the Invention

This invention relates to improvements in a brake device for use with shutters in cameras.

2. Description of the Prior Art

In general it is desirable that the shutter curtain run down at as fast a speed as possible. But, the increase in the running speed called for merely by strengthening the driving power on the shutter curtain will give rise to the disadvantage that the shutter curtain is caused to vibrate or bounce by its inertia at the end of its running down movement. To avoid this, a brake device must be provided for slowing down the running shutter curtain from the time just before the running down movement of the shutter curtain is terminated. Such brake device for the shutter conventionally takes the form shown in FIG. 1, where on a brake shaft 1 for the front, or rear shutter curtain there are mounted a pivotal member 2, a frictional member 3 and a pressing member 4, and these members 2, 3 and 4 are secured to a base plate 7 through a spring 5 by a nut 6. The pressing member 4 is anchored at its bent-off portion 4a to the base plate 7. When the driving or master gear 8 of the shutter curtain rotates in a direction indicated by an arrow, a pin 8a planted on the upper surface of the master gear 8 comes to abut on the pivotal member 2 at one end 2a thereof, and the pivotal member 2 is then rotated while the frictional member 3 applies a load thereon. During this time, a spring 9 also applies a braking force to the pivotal member 2. Thus, the combined action of the frictional member 3 and the spring 9 slows down the master gear 8 and brings it to rest. The pivotal member 2 has another arm 2b with an electrical insulator band fixedly secured thereto and serves as an actuator for a synchro contact (not shown).

Since the conventional brake device requires a large number of members mounted on a common shaft as will be seen from the above, it becomes complicated in design and increases the number of steps in the fabricating process which in turn calls for an increase in the production cost.

It is an object of the present invention to overcome the above-described drawbacks and to provide a brake device for use with a shutter having a driving member which device includes a pivotal brake member arranged to engage with the shutter driving member as it runs down and which brake member is mounted on a stationary shaft, whereby at least one of the brake member and the stationary shaft is made of an elastic material to apply a torsional friction force to the pivotal member, and this friction force is made to contribute to the braking of the shutter driving member.

Another object of the present invention is to provide a brake device of the character described above in which at least one of the brake member and the stationary shaft is provided with a spring for adjusting the friction force to a desired value.

These and other objects and features of the present invention will become apparent from the following detailed description of embodiments thereof taken in conjunction with the accompanying drawings in which:

DESCRIPTION OF THE PREFERRED EMBODIMENTS

The first embodiment of the present invention will next be explained by reference to FIGS. 2 and 3.

Figure 1:
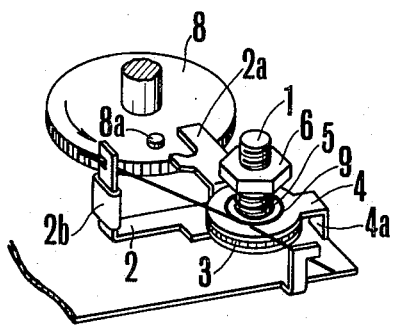
FIG. 1 is a perspective view of the conventional brake device for the shutter.
Figure 2:
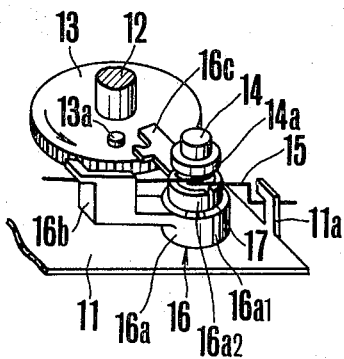
FIG. 2 is a perspective view of a first embodiment of the brake device according to the present invention.

FIG. 2 shows a brake device for the shutter mounted on a ground plate 11 along with a master shaft 12 fixedly carrying a front shutter curtain master gear 13. A front curtain brake shaft 14 of metal or similar material has one end fixedly secured to the ground plate 11, the opposite end of which is provided with a groove 14a for accommodating a brake spring 15. Fitted on the stationary shaft 14 is a pivotally rotatable member 16 made of an elastic material such as plastic and having two arms 16b and 16c radially extending from a tubular portion 16a thereof. The tubular portion 16a has an axially extending cutout 16a1 and a circumferentially extending annular groove 16a2 in which a spring 17 is convoluted. This pivotal member 16 exerts an elastic force at the tubular portion 16a on the brake shaft 14 for the front shutter curtain. When the pivotal member 16 is turned about the shaft 14, a torsional friction force is applied thereto which is adjusted by varying the strength of the spring 17 convoluted on the stepped-down portion 16a2 of the pivotal member 16. The spring 15 has two arms one of which engages with one arm 16b of the pivotal member 16 and the other one of which engages a lug 11a of the ground plate 11. The two arms of the spring 15 are joined to form a rounded base which is received in an annular groove 14a of the stationary shaft 14. The other arm 16c of the pivotal member 16 extends into the path of movement of a pin 13a fixed on the front curtain master gear 13.

When the camera is actuated to release, the front curtain of the shutter is driven to run down as the master gear 13 rotates in a direction indicated by an arrow. At a time near the end of the running down movement of the front curtain, the pin 13a strikes the arm 16c of the pivotal member 16 and then turns the latter. Since the pivotal member 16 is fitted on the over-dimensioned shaft 14 with the provision of an adjustable elastic force by the spring 17, as the pivotal member 16 is turned, a frictional force is applied to the pivotal member 16, and, at the same time, the spring 15 is tensioned. Thus, a combination of the two spring operations slows down the speed of rotation of the master gear 13 for driving the front curtain.

It will be appreciated from the foregoing that in the first embodiment all that is provided on the shaft 14 is the pivotal member 16 and two springs 15 and 17, and nothing more is necessary to construct a brake device for the shutter so that it can be made simple in design as compared with the conventional brake device.

It should be noted that if a necessary elastic force is imparted into the pivotal member 16 by selecting a suitable material for employment therein, the spring 17 for the friction force adjustment may be omitted to further simplify the structure of the brake device.

Figure 3:
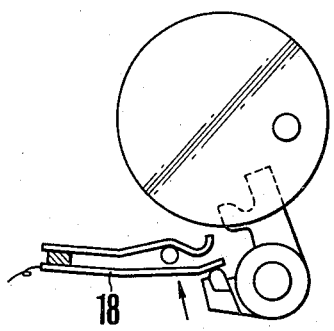
FIG. 3 is a bottom plan view showing an example of an arrangement of a synchro contact adjacent the device of FIG. 2.

Another advantage arising from the use of nonmetallic material or plastic in the pivotal member 16 is that the bare arm 16b of the pivotal member 16 suffices to serve as an actuator for a synchro contact 18 as shown in FIG. 3, and therefore there is no need to provide the electrical insulator member therefor as in the conventional braking device.

Figure 4:
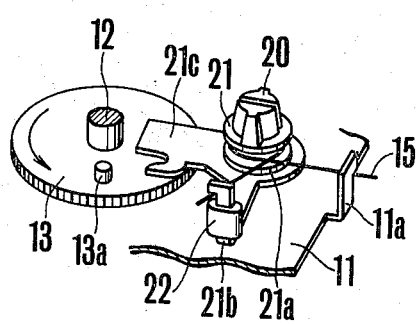
FIG. 4 is a perspective view of a second embodiment of the brake device according to the present invention.

The second embodiment of the present invention will next be described by reference to FIG. 4 where the same reference characters have been employed to denote the similar parts to those shown in FIG. 3. FIG. 4 shows a ground plate 11 of the shutter unit. A driving shaft 12 on the ground plate 11 fixedly carries a master gear 13. A front curtain brake shaft 20 made up from plastic or similar material is fixedly mounted at one end thereof on the ground plate 11, the opposite end of which is provided with a diametrical and axial cutout with the resultant halves being biased in opposing directions, that is, in FIG. 4, in an outward direction away from each other. A pivotally rotatable member 21 is fitted on the brake shaft 20 and has a circumferentially extending annular groove 21a formed in a portion of its sleeve and includes two arms 21b and 21c. The pivotal member 21 frictionally engages the brake shaft 20 by the elastic force of the two separated halves at one end thereof. And, one end of a spring 15 convoluted on the groove 21a of the pivotal member 21 is engaged with one arm 21b of the pivotal member 21, and the other end of the spring 15 is engaged with a lug 11a of the ground plate 11. The other arm 21c of the pivotal member 21 is arranged to be engageable with a pin 13a fixed on the master gear 13. An electrical insulator 22 serves as the actuator for the synchro contact and is provided on the arm 21b of the pivotal member 21.

When the camera is actuated to release, the front curtain driving or master gear 13 is rotated in a direction indicated by an arrow and the pin 13a strikes the arm 21c of the pivotal member 21. Then, the pivotal member 21 is turned. Since at this time a friction force is exerted on the pivotal member 21 relative to the front curtain brake shaft 20 by the elastic force of the two separated halves at one end of the shaft 20, the pivotal member 21, while being subjected to the friction force and to the biasing force of the spring 15 in the opposite direction, is rotated to slow down the speed of rotation of the front curtain master gear 13.

As in the above, according to this embodiment, it is possible to provide a brake device of simple construction comprising only the shaft 20, pivotal member 21 and spring 15.

Figure 5:
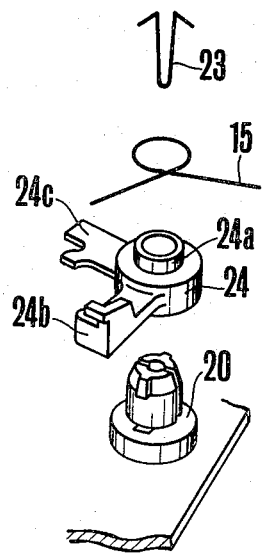
FIG. 5 is an exploded perspective view of a third embodiment of the brake device according to the present invention.

The third embodiment of the present invention will next be described by reference to FIG. 5 where the same reference characters have been employed to denote the similar parts to those shown in FIG. 4, and their detailed explanation is omitted. The upper end of the front curtain brake shaft 20 of elastic material, which is divided into halves by the axial split, has a recess for receiving a friction force adjusting spring 23. A movable member 24 is fitted on the front curtain brake shaft 20. The rounded base of the movable member 24 has a circumferentially extending annular stepped-down portion 24a and two arms 24b and 24c radially extending therefrom. A spring 15 is convoluted one turn on the stepped-down portion 24a of the movable member 24. One end of this spring is engaged with one arm 24b of the movable member 24, and the opposite end is engaged with the lug 11a (not shown in FIG. 5) of the ground plate 11. A friction force is exerted on the movable member 24 by the elasticity of the two separated halves at the upper end of the brake shaft 20, and this friction force is adjusted by the spring 23 provided in the recess of the upper end of the brake shaft 20. Thus, the front curtain driving or master gear 13 is slowed down by the friction force of the elastic member 24 and the force of the spring 15.

Each of the above embodiments has been described in connection with the brake device for the front curtain of the shutter. But the present invention is applicable not only to the front curtain brake but also to a rear curtain brake, as a brake device of the same construction may be used therefor.

As has been described in detail, according to the present invention, at least either one of the brake shaft and the movable member is made up from an elastic material so that these two parts and one spring member suffice to construct a brake device for the shutter which is thus very simple in design as compared with the conventional brake device, inexpensive to fabricate and yet is efficient and effective in operation when the friction force exerted between the brake shaft and the movable member thereon is adjusted by the use of an additional spring member. An additional advantage is that as the movable member is made up from plastic or other suitable elastic material, it may be used to directly actuate the synchro contact.

What is claimed is:
1. A brake device for a shutter including:
 (a) a shutter driving shaft movable in response to a shutter operation;
 (b) a shutter driving member attached to the shutter driving shaft;
 (c) a ground plate;
 (d) a stationary member mounted on said ground plate and positioned in the region of the shutter driving shaft;
 (e) a brake member fitted on the stationary member for rotation relative to the stationary member, said brake member comprising an elastic material, and having an engagement portion engageable with said shutter driving member so that a friction force developed between the elastic brake member and the stationary member provides a braking force to the shutter driving member when the shutter driving member engages with the engagement portion; and
 (f) biasing means for applying a biasing force to said brake member, said biasing means exerting the biasing force to provide another braking force to the shutter driving member in addition to the braking force provided by the friction force.
2. A brake device according to claim 1, wherein said biasing means is a first spring.
3. A brake device according to claim 2, wherein said stationary member is a stationary shaft, and said brake member has a sleeve portion provided with an axial slit and said sleeve portion is fitted on said stationary shaft.
4. A brake device according to claim 3, further including:
 a second spring convoluted on the sleeve portion of said brake member which is provided with the slit, said second spring increasing the friction force produced between the slitted sleeve portion of said brake member and said stationary shaft.

5. A brake device for a shutter including:
(a) a shutter driving member movable in response to a shutter operation;
(b) a rotatable brake member having an engagement portion engageable with said shutter driving member;
(c) a ground plate;
(d) a stationary member mounted on said ground plate and inserted into said brake member, said stationary member comprising an elastic material for frictionally contacting said brake member so that a friction force is exerted between said brake member and said stationary member when said brake member pivots on said stationary member, and said friction force provides a braking force against the motion of said shutter driving member when said shutter driving member engages with said engagement portion of said brake member; and
(e) biasing means for applying a biasing force on said brake member to provide an additional braking force against the motion of said shutter driving member.

6. A brake device according to claim 5, wherein said biasing means is a first spring.

7. A brake device according to claim 5, wherein said stationary member is a stationary shaft provided with an axial slit at the free end thereof, and said brake member has a sleeve portion fitted on said stationary shaft.

8. A brake device according to claim 7, further including:
a second spring arranged in the slit of said stationary shaft to apply a separating force at said free end of said stationary shaft so that said slit is opened, said second spring increasing the friction force between the free end of said stationary shaft and the sleeve portion of said brake member.

9. A brake device for a shutter including:
(a) a shutter driving member movable in response to a shutter operation;
(b) a rotatable brake member arranged to engage with said shutter driving member;
(c) a ground plate; and
(d) a stationary shaft for mounting said brake member on said ground plate wherein at least one of said stationary shaft and said brake member comprises an elastic material, and the member of said elastic material is provided with a slit of certain dimensions which slit is arranged so that said brake member and said stationary shaft frictionally engage with each other to produce a friction force when the dimensions of said slit are varied, and said friction force provides a braking force against the motion of said shutter driving member.

* * * * *